United States Patent
Fox

Patent Number: 5,890,134
Date of Patent: Mar. 30, 1999

[54] SCHEDULING OPTIMIZER

[75] Inventor: Barry Ross Fox, Houston, Tex.

[73] Assignee: McDonnell Douglas Corporation, Huntington Beach, Calif.

[21] Appl. No.: 602,966

[22] Filed: Feb. 16, 1996

[51] Int. Cl.⁶ .................................................. G06F 17/60
[52] U.S. Cl. ............................................. 705/9; 364/468.06
[58] Field of Search .......... 705/8, 9; 364/468.05–468.1; 395/670–674, 557

[56] References Cited

U.S. PATENT DOCUMENTS

| | | | |
|---|---|---|---|
| 4,888,962 | 12/1989 | Harper et al. | 62/503 |
| 4,896,269 | 1/1990 | Tong | 364/468 |
| 5,093,794 | 3/1992 | Howie et al. | 364/468 |
| 5,099,431 | 3/1992 | Natarajan | 364/468.12 |
| 5,233,533 | 8/1993 | Edstrom et al. | 364/468 |
| 5,241,465 | 8/1993 | Oba et al. | 364/401 |
| 5,319,781 | 6/1994 | Syswerda | 395/650 |
| 5,402,350 | 3/1995 | Kline | 364/468.07 |
| 5,406,476 | 4/1995 | Diziel et al. | 364/402 |
| 5,408,663 | 4/1995 | Miller | 395/650 |
| 5,442,730 | 8/1995 | Bigus | 706/19 |
| 5,655,118 | 8/1997 | Heindel et al. | 705/2 |

Primary Examiner—Frantzy Poinvil
Attorney, Agent, or Firm—Alston & Bird LLP

[57] ABSTRACT

A schedule optimizing algorithm improves scheduling quality, reducing a schedules cycle time and requiring only marginal increase in computer execution time. Lower quality computerized scheduling programs are substantially improved through the additional steps of sequential left time shifting and right time shifting of respective chronologically sorted completion time and starting time task listings.

14 Claims, 3 Drawing Sheets

SCHEDULING OPTIMIZER

FIELD OF THE INVENTION

This invention relates to a computerized scheduler and, more particularly, to an improved method or algorithm for efficiently defining and/or optimizing the performance schedule of the multiple tasks necessary to the accomplishment of a project, particularly a manufacturing project, taking both resource and precedence constraints into account.

BACKGROUND

It is well recognized that the construction of any building, machine or equipment, generally referred to as a project, requires the collective performance of a number of individual operations or tasks for successful completion. Resources are required, as example, personnel, trained to accomplish the task, capital equipment and other resources, supplies and component parts, which need to be procured or built. Each task requires a finite time, determined by past experience, for completion. And precedence must be followed, in that some tasks typically must be completed before other tasks in the project may begin.

Prudence requires planning and, particularly, formulation of a schedule that defines the who, when, where and the how that is necessary for completion of the project in an orderly and efficient manner. In earlier eras, the foreman or manufacturing engineer, possessed the experience, training and intellect to arrange the tasks required by the project in mind and specify which persons were to carry out the tasks, the resources and supplies required, and other necessary details. That person could also provide a reasonable estimate of the time of completion as allowed prediction of a delivery date.

As modern factory projects attained greater complexity, schedules required better definition and were more scientifically defined by persons, often now referred to as industrial engineers. With essentially pen, ink and calculator, such persons were able to search through the requirements and present the paper documents defining the tasks and the resources associated with them and to arrange the order of tasks for completion, creating time-lines of individual tasks and chronological order of the tasks commencement and completion, namely produce a project schedule. As projects became more complex still, those scheduling techniques often proved inefficient and, while less than perfect, necessarily sufficed until the advent of automated calculating machinery, such as the modern digital computer and the now familiar scheduling programs carried out by the computer.

In the modern competitive industrial world, however, all resources and personnel are held to a minimum and must be allocated. Little excess personnel or equipment is available to a manufacturer. Excess resources are expensive to maintain and, if carried idle by the manufacturer for too long, results ultimately in financial collapse attributed to inefficiency. Thus, the usefulness of a schedule as a useful industrial tool and the benefit of efficient scheduling to industrial craft is well understood.

In this endeavor the modern digital computer, more specifically, a programmed general purpose digital computer, plays an important role as a scheduler to expedite production of an acceptable schedule definition more quickly and efficiently than could be accomplished by human intellect alone. The computer is governed by a program, called software, and makes the necessary steps, called algorithms, set forth by the program. And those programs of interest here are those that deal with scheduling, hereinafter referred to as scheduling programs. In and of itself the digital computer is an instrument or tool for specifying not only the steps of the desired schedule, but also carries out the steps or method for attaining and defining those steps.

One known scheduling program used in the industry is called COMPASS, which is written in the well known ADA computer language or source code, as variously termed, and is used principally with workstation computers using the Unix operating system. A more recently introduced scheduling program is Microsoft Project which is written for operation on personal type computers, such as the Intel 486 and 586 processor based personal IBM type computers with Windows operating systems.

Scheduling is a difficult art. Mathematically the scheduling process is categorized as N.P.-Hard. This means that in order to determine an optimum schedule, one that accomplishes the project with available resources in a minimum amount of time to project completion, and which can be mathematically proven to be the optimum schedule, requires an unduly large amount of searching operations by the computer. That in turn requires computer time in such large amounts as to render those kinds of computerized scheduling programs impractical for industrial use.

To construct a modern aircraft involves many thousands of individual tasks, a vast number of technicians and assemblers, and a large amount of resources. To prepare a schedule for such a project would likely overwhelm the genius of any person working with pen, paper and calculator and would require an inordinate amount of time for one person or even a group of people to schedule to complete with minimal errors. One should not expect that the definition of a schedule to construct an aircraft should require preparation time that exceeds the construction time of an aircraft, disregarding the realism which necessitates redefining the schedule when tasks are not completed on time as originally planned, as for example due to acts of force majeure, such as electrical failure or flood.

As a consequence the scheduling programs implemented for industry are referred to as "Heuristic" in nature. That is, the algorithm that forms the essence of the scheduling program is based on a skilled person's intuition. Based on experience such programs are known to function to produce a good schedule, and/or improve an existing schedule. The logic as to why, the mathematical proof, however, is absent. The present invention is also heuristic in nature and the new algorithms presented are also based on intuition.

The duration between the start of the first scheduled project and the finish of the last scheduled task in a multiple task project is one measure of schedule "quality", often referred to as span time or cycle time. Another is the time required for the time to complete the process of formulating a schedule, that is, for the computer to execute the algorithms and process the entered task data to generate and display the schedule, often referred to as the "execution time".

Even Heuristic based scheduling programs are not created equal and vary widely in quality. Most computer assisted programs for producing good schedules suffer one of two basic flaws. Either they use simple methods that work quickly, but produce schedules with inferior "cycle time", or that use methods that produce schedules with good cycle time, but require excessive amounts of computer execution time. In short, the schedules produced takes too much time for project completion or the program takes too much time to formulate the schedule.

Some of these scheduling programs, such as one attributed to Gil Syswerda, provide an improved schedule, each time the program is run, continuing until a point of diminishing return is reached at which addotional improvement to the schedule is miniscule and does not justify further investment of computer execution time. The algorithm produces incremental improvement. The present algorithm is of like kind, producing incremental improvement each time the algorithm is applied to the most recently produced schedule.

An object of the present invention is to provide an improved scheduling method and apparatus and to improve upon existing scheduling methods and apparatus.

Another object of the invention is to provide an algorithm that may be added to existing scheduling programs for improving the quality of the formulated schedules.

An additional object of my invention is to provide an efficient method for defining a high quality schedule.

Still another object of the invention is to produce schedules for projects comprised of multiple tasks having minimal cycle time with only marginal increase in computer execution time.

And an ancillary object of the invention is to provide a novel scheduling algorithm that enhances existing scheduling programs.

SUMMARY OF THE INVENTION

In accordance with the foregoing objects, a new scheduling algorithm is presented that improves the quality of existing computer assisted scheduling programs and as integrated therein defines an improved scheduling program.

In the improved method, a multiple task schedule, initially formulated by the scheduling program, is subjected to the additional processing steps of: setting a completion time boundary that is as late or later than the latest completion time of any of the tasks; setting a start time boundary that is no later than the earliest start time of any of those tasks; preparing a chronological listing by completion time for the tasks, a sort, whereby the tasks are assembled in a different order than before; starting with the task having the latest completion time and continuing through the chronological listing in reverse chronological completion time order, "right shifting" each task in time, that is rescheduling each task in the chronological listing to a new completion time that is no later than and as close to the completion boundary time as is permissible without violation of any resource constraint, to create a first revised temporary listing of tasks arranged in the same order found in the chronological listing; preparing a second chronological listing by start time for each task in the revised listing, another sort; and, starting with the task in the second chronological listing having the earliest start time and continuing in chronological order through the remaining tasks, rescheduling each task to a new start time that is no earlier than and as close to said commencement time boundary as is permissible without violation of any resource constraint, whereby each task is again assigned new start and completion times, but remain arranged in the same order found in said second chronological listing, to thereby formulate the improved or optimized schedule.

As empirical evidence demonstrates the foregoing algorithm produces a schedule that prescribes a reduced cycle time for a project. That reduced cycle time translates to increased efficiency and cost savings, as those skilled in the art recognize.

It is appreciated that the foregoing algorithm can be used to either build efficient schedules in the first instance or to improve upon a given schedule.

A further aspect of the invention includes programming elements for electronic digital computers. Such programming elements include media, such as magnetic disks, optical disks and the like. The programming elements according to the present invention have program data encoded thereon for activating an electronic digital computer to perform the previously described method.

DESCRIPTION OF THE PREFERRED EMBODIMENTS

Figure 1:
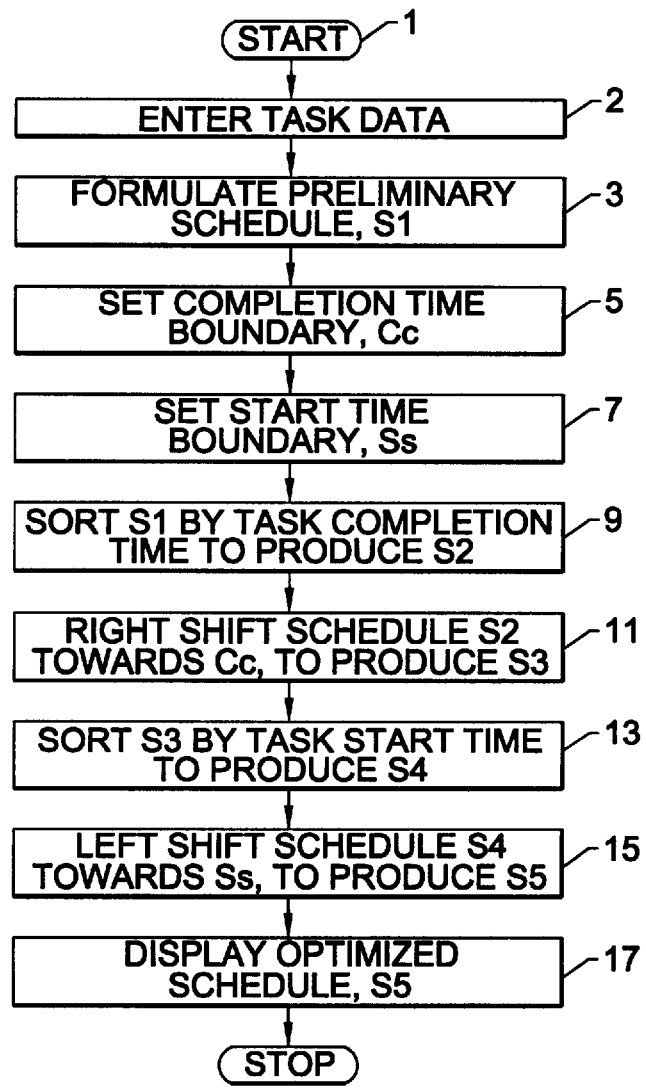
FIG. 1 is a flow chart illustrating the steps and operations defining a preferred embodiment of a scheduling program that incorporates the novel steps or algorithm characterizing the invention.

Reference is made to the flow chart of FIG. 1 which illustrates the method defining the optimized scheduling program that is carried out by a digital computer. Brief reference may be made also to the accompanying flow charts of FIGS. 2 and 3, which illustrate in greater detail certain steps comprising the right shift and the left shift subroutines or operations generally illustrated in FIG. 1.

As becomes apparent, the detailed description that follows is presented largely in terms of algorithms and symbolic representations of operations on the data bits and data structures found within a computer memory. These algorithmic descriptions and representations are a convenient means used by those skilled in the computer programming arts to effectively convey the substance of their work to others.

An algorithm is here, and generally, is conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals sometimes as bit patterns, values, elements, symbols, characters, data packages, or the like. It should be borne in mind, however, that all of these and similar terms as may appear herein are to be associated with the appropriate physical quantities and are merely convenient labels applied to these quantities.

Further, the manipulations performed are often referred to in terms, such as sorting or comparing or inspecting data such as times, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself.

The present invention also relates to an apparatus for performing these operations. This apparatus may be specially constructed for the required purposes, or it may comprise a general purpose computer as selectively activated or reconfigured by a computer program stored in the computer.

Figure 4:
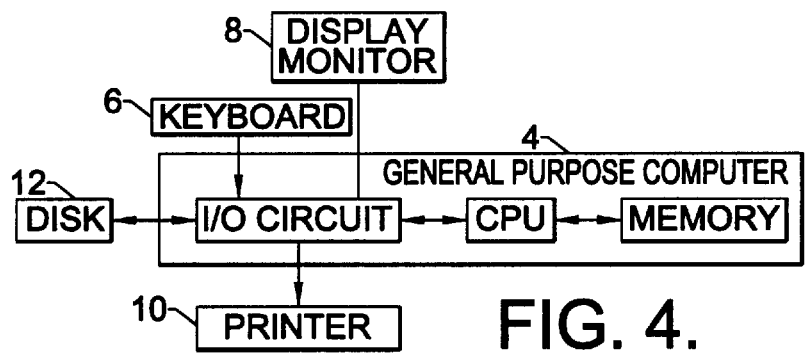
FIG. 4 illustrates a computer and associated peripheral accessories with which to carry out the scheduling program.

The method of the present invention may be practiced on any conventional digital computing apparatus such as diagramatically illustrated in FIG. 4. There, the scheduling program illustrated by the flowchart of FIG. 1 is stored for execution in a computer 4, e.g. such as an IBM PC/AT type 586 personal computer. The data inputs described herein may be entered into the computer through an associated keyboard device 6. The scheduling program may be stored initially on a floppy disk, the programming element, and loaded into the computer via a peripheral device, such as a floppy disk drive 12. The final, conflict free schedule would preferably be displayed on a graphics display device 8 such as a computer monitor and/or printed out on a printer 10. The scheduling program embodying the novel algorithm would preferably be written in a conventional programming language such as "ADA". The program has, however, been successfully implemented on a Sparc workstation computer, manufactured by Sun Microsystems of Sunnyvale, Calif., among others.

The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

The present improvement is described as an addition to a pre-existing scheduling program, such as the COMPASS scheduling program referred to earlier, as example. The COMPASS program meets certain minimum requirements: First, the scheduling program contains the capability of allowing one to sort scheduled tasks by start time and also by finish time. Second, such program contains the ability to construct schedules forward in time, beginning with a designated start time, as example a start time designated by the program user, often referred to as a "forward mode", and backward in time, beginning at a designated finish time, referred to as a "backward mode". And thirdly, the scheduling program just be capable of acting upon each task in a sorted order of tasks, that is tasks which are given in a defined order from first to last, without modifying the given order of the tasks, and the ability to apply scheduling operations, unscheduling operations, and rescheduling operations to the sorted order of tasks.

In addition to the COMPASS scheduling program, the MICROSOFT PROJECT scheduling program also possesses such capabilities; and the scheduling programs described in U.S. Pat. No. 5,408,663 granted Apr. 18, 1995 to Miller, entitled Resource Allocation Methods, U.S. Pat. No. 5,233,533, granted Aug. 3, 1993 to Edstrom et al, entitled Method and Apparatus, and U.S. Pat. No. 5,093,794 granted Mar. 3, 1992 to Howie et al, entitled Job Scheduling Program, also appear to contain such capabilities.

It is noted that any scheduling programs found that do not contain the described capabilities can be modified by programmers to include them, if modification is possible. If the particular scheduling program selected by one wishing to practice this invention does not contain such a sort routine, however, such scheduling program must be modified to include one. As such sort routines are well known programming routines, such may easily obtained and incorporated within the program with minimal effort. However, the preferred expedient is to chose a scheduling program as a base, which contains all those features or, if not, all those features, or all except the sort feature, the latter of which can easily be incorporated within any existing program with only minimal programming effort.

As is represented in block 1 of FIG. 1, with the foregoing general description of a known scheduling program as background, the scheduling program is run to formulate and/or define, as variously termed, a tentative schedule for the tasks. The program requests entry of the task data, which is entered into the program as data, manually via the computer's keyboard, scanned in via a scanner, or by any other conventional means of data entry. Thereupon the scheduling program executes, as upon the user's command.

The scheduling program is started in the conventional manner and calls for the entry of task data, represented at block 2. Each task entered into the computer for a project, includes information on the identification of the task I, such as "install pilot seat", task duration, D, the required resources, R, and the precedent constraints, P, applicable to the task.

As an example, one constraint may be that a certain task must be performed before another, a precedent constraint, such as, in the construction of an aircraft, the pilots seat must be installed prior to installation of the pilot's overhead window or canopy. Thus before the canopy installation task can start, the scheduling program must look to determine whether the seat installation task is scheduled for completion and only then assign a start time for the canopy installation task. The COMPASS scheduling program ensures that the assignment of start time and completion time for each task in the project is consistent with and does not violate an applicable task priority constraint.

As is typical of scheduling programs, the inventory of available resources, RI, such as the manufacturing equipment, tools, human resources and skills, as called for by the scheduling program is entered in kind and quantity into the computer. The data on resources enables the scheduling program to allocate all available resources to the various tasks. In the event that a particular number of available resources is insufficient in quantity to allow accomplishment of all tasks simultaneously, as is typically the situation, in preparing the schedule the computer schedules the number of such resources as are available amongst the various tasks requiring the resource, in some preferred Heuristic order according to the algorithms forming the scheduling program. The scheduling program also ensures that the time allocations assigned to such resource for a task does not conflict with another task. That is, the resource is assigned to tasks without violating a resource constraint.

To avoid unnecessary detail in this application, it is not necessary to describe in this specification the steps in and/or source code programming of the known scheduling programs, such as COMPASS, and the algorithms forming such programs, since those are previously known to those skilled in the art, and those details are not necessary to an understanding of the present invention, which is an addition to and an improvement of such prior scheduling programs.

The computer thereupon processes the data in accordance with the steps prescribed in the scheduling program, carrying out the methodology prescribed in the scheduling program, and, following the expiration of the program's "execution time" completes the program's run and produces a schedule, S1, referred to, variously, as a tentative or preliminary schedule, represented by block 3.

The tentative schedule, S1, may be generally visualized by its individual elements as follows:

| (1) Task A | S1, C1, D1, R1, P1, I1 |
|---|---|
| (2) Task B | S2, C2, D2, R2, P2, I2 |
| ... | |
| (N) Task n | Sn, Cn, Dn, Rn, Pn, In | in which S is the start time, C is the completion time, D is the duration, R is the resource information, P is the precedence information and I is the identification of the task. That schedule is typically displayed on the computer's monitor, 8 in FIG. 4, and/or the associated printer 10 prints out the information.

From among the multiplicity of tasks in the project, the formulated schedule contains a task that begins no earlier than any other task in the project, the earliest start time. The schedule also contains another task that ends no later than any other task in the project, the latest completion time. The difference between those two times defines the cycle time for the project. Whatever the choice made for the basic scheduling program, it is assumed that the program produced has a "good" cycle time, one that appears reasonable, and that the scheduling program had a reasonable execution time; in other words it is a good quality program. Given a "good" cycle time, it is seen that the present improvement makes a better cycle time, thereby improving upon quality.

It is briefly noted that the foregoing is the state achieved by existing scheduling programs. There is no way of determining how "good" a schedule was achieved, unless one is able to demonstrate that another schedule can be created in a reasonable time that has a shorter cycle time. The only methods for such demonstration are to either use another program to construct a schedule to see if another algorithm might produce a better schedule, or to reorder the input data to see if another order for processing the given tasks might produce a better schedule.

In the next step the computer identifies the latest completion time for any of the tasks listed in schedule S1 and sets that completion time C, as the right boundary, Cc, which step is represented at block 5; and to identify the earliest start time for any of the listed tasks in that preliminary schedule and set that start time S as the left boundary Ss, which step is represented at block 7.

In the foregoing steps, the boundaries are set automatically by the scheduling program. The boundaries may, alternatively, be manually set by the user. In that event, the program should come to a halt and output to the display the appropriate message for the operator, as example, "Please insert the desired time desired for the right boundary? Note that the latest completion time of any task is (completion time)". The operator then enters the desired completion time via the computer keyboard. Following, the program next requests information on the left boundary in like manner with display of a similar query and the operator enters the desired start time boundary.

It is appreciated that the foregoing task listing S1 lists the tasks in no particular order, since such ordering is not required of a scheduling program and, hence, is not required by the known scheduling program upon which the present algorithms are imposed. Should by chance or design the prior scheduling program include such a feature, such as the scheduling programs earlier referred to, it is useful in the practice of the present invention, as next described.

The program sorts the listed tasks in chronological order by completion time C, as represented by block 9, to produce a chronological listing by completion time, S2.

It is appreciated that the tasks in this second list are the same in number, n, as in the first, but that the particular tasks listed in (a) above are not likely to be listed in the same order presented in the tentative schedule. Hence a different representation is given for the tasks in this sorted order. It should be understood, however, that each task in the first list, such as task B, finds a counterpart in the tasks of the second sorted list, Task AS as example, assuming only for purpose of illustration that the sort procedure reversed the positions of the first two tasks in the tentative schedule. The foregoing convention is used for each of the listings hereafter described.

It is recognized that the previously described time boundary setting steps may be accomplished prior to or following the sorting step, since neither step is dependent upon the other in function or precedent. That is a matter of designer's choice.

The algorithm next returns control and/or branches back, as variously termed to the main scheduling program to accomplish a shifting operation. Working in reverse chronological order in the chronological listing, starting with the last task in the list, that is, from the task with the latest completion time, each task is "right shifted" as much as is permissible to the right completion time boundary, as represented by block 11. That is, each task is unscheduled and rescheduled to start and finish as late as possible prior to or at the right time boundary, Cc, without violating any of the applicable constraints and requirements associated with the respective task. In making this shift and evaluating for resource conflicts, it is understood that the main scheduling program considers each task's duration, and, hence, the new start time as would be assigned to the respective task.

The foregoing backward shifting is accomplished by use of the capability of the underlying scheduling program, which is required to have the ability to perform "backward mode" scheduling, that is, to schedule tasks to start and finish as late as possible, and also the ability to perform "forward mode" scheduling, that is to schedule tasks to start and finish as early as possible, such as the capability found in at least the COMPASS scheduling program and the Microsoft Project scheduling program.

Each task is thus assigned a new completion time, C, and, based on the data respecting the duration required for the particular task, the task is assigned a new start time S. It should be noted that the "order" of the tasks in the "right shifted" task listing remains unchanged from the order in which those tasks appeared in the prior sort operation. However, the tasks may likely no longer be in chronological order as before, as a consequence of any reassignment of completion times. This task listing, S3, another temporary schedule of itself, may be represented as follows:

| (1) Task AS | W1 (S, C, D, R, P, I) |
|---|---|
| (2) Task BS | W2 (S, C, D, R, P, I) |
| ... | |
| (3) Task nS | Wn (S, C, D, R, P, I) |

As those skilled in the art appreciate, the foregoing sort may also be accomplished by reversing the listing, an equivalent, by sorting the tentative task schedule in reverse chronological order by completion time and then selecting the first task in the list, which would then hold the latest completion date, and right shifting the first task in such listing for undergoing unscheduling and rescheduling, and continuing down through the task listing.

Figure 2:
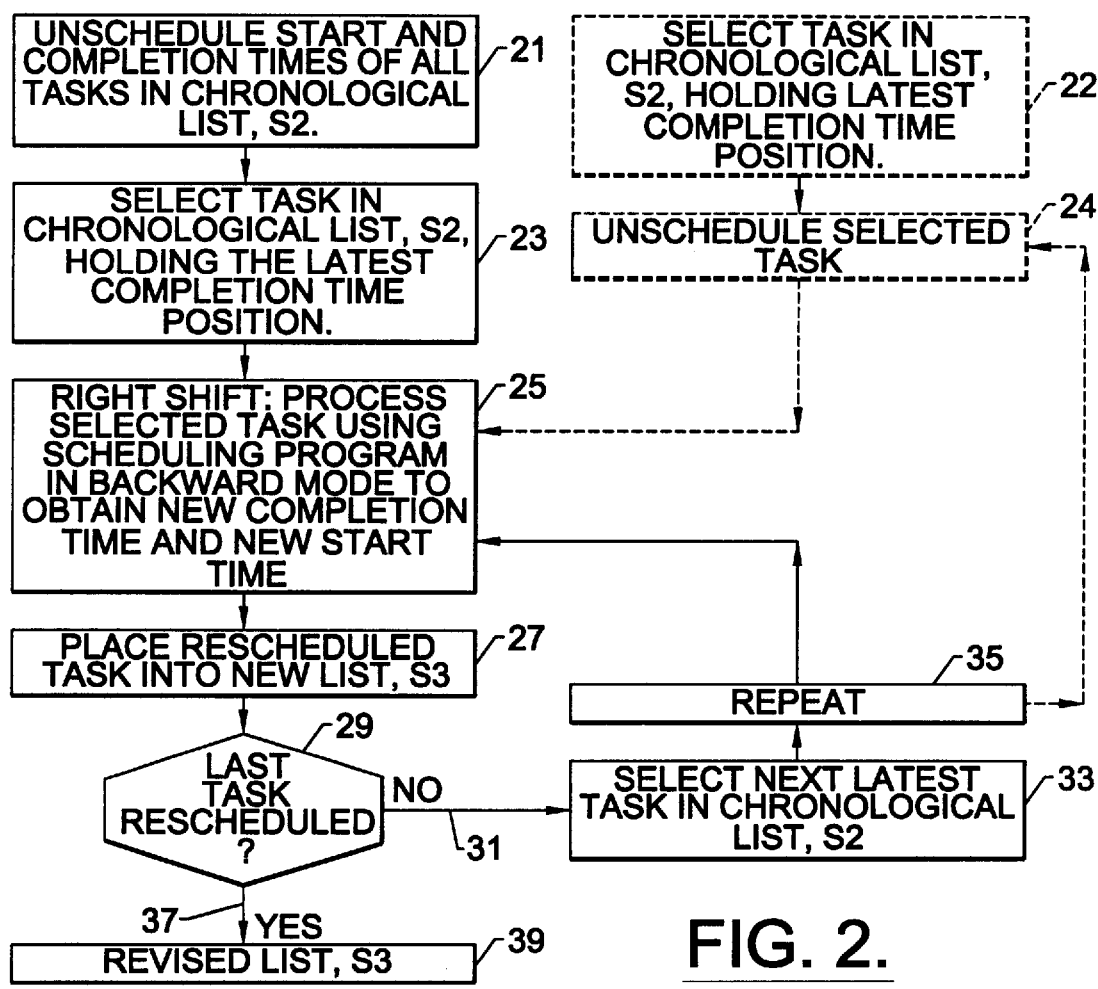
FIG. 2 is a flow chart of a right shift subroutine used in the method of FIG. 1.

There are two subsidiary methods of performing the foregoing rescheduling step which may be conveniently considered at this stage of the procedure, such as illustrated in the flow chart of FIG. 2 to which reference is made. One is to individually unschedule and reschedule each task, one by one, or, alternatively, unschedule all tasks and commence rescheduling with the last task in the completion time chronological order. In the first instance, the main scheduling program need deal with inserting one set of times, while the other task times remain fixed. In the latter the main scheduling program deals with the task data as raw, except for the order in which tasks are given reassigned times, which requires the scheduling program to run through a repeat "cycle time" to accomplish the result. Since the two sub-routines represent a slightly different situation for the main scheduling program, a slightly different schedule necessarily results when employing the latter subroutine in lieu of the former.

As illustrated by block 21 in FIG. 2 all tasks in chronological list S2 are unscheduled; a selection is made of the task in the latest completion time position in the chronological list as at block 23. As represented at block 25, the main schedule program then processes that selected task and reschedules it to the latest completion time permissible consistent with any applicable resource constraints and, based on the duration of the task, assigns a new start time also consistent with any applicable resource restraints; and places the task in a memory location for a new list in the last place location in the list as at block 27.

Checking to determine whether the processed task was the final task requiring completion as at decision block 29, and receiving a negative reply as at block 31, the main scheduling program next selects the task from the list that had the next to the latest completion time, as represented at block 33 and repeats, as at block 35, returning to the backward mode shifting, as at block 25, to process the task and assign the next task the latest available completion time, again consistent with any resource constraints. And the rescheduled task is entered in the next to last position in this new list. This process repeats, task by task, through the N tasks, until the decision at block 29 is affirmative, in which case the affirmative flag 37 pronounces the new revised list S3 complete as represented at block 39.

In the alternative procedure represented in part by the dash block outlines in FIG. 2, the task in the listing having the latest completion time position is selected as represented at block 22; and that selected task is unscheduled as represented at block 24; is processed by the main program, as at block 25, in the backward mode to determine the latest available completion time consistent with any resource constraints and a like start time also consistent with those constraints, which references as needed the various times still assigned to the other tasks whose start and completion times were not yet unscheduled, placing the task entry in the last position in a new list, as at block 27. As in the prior technique the program passes through the decisional block 29, the negative decision at 31 and the selection of the task in the listing having the next-to-last completion time position, as represented at block 33 and repeats at 35, processing this next task as at block 35 to right shift the task to the then latest available completion time as-close as permissible to the completion time boundary Cc consistent with resource restraints, and assigns a new start time also consistent with resource constraints. This procedure continues, consecutively filling the new list, bottom to top, until an affirmative decision 37 occurs at block 37, indicating that all of the N tasks in the listing have been processed in the foregoing way and the program arrives at the revised listing S3 as at block 39.

Returning to the flow chart of FIG. 1 and continuing with the new algorithms, the various tasks listed in the "right shifted" task listing or temporary listing, S3, are again sorted, this time into chronological order by the respective start times, S to obtain another chronological listing, S4, represented in block 13. The first task in the listing S4 contains the earliest start time, S, and the last or "nth" task in the listing contains the latest start time.

This sorted listing, S4, which in itself is a schedule, may be represented as follows:

| (1) Task AT | X1 (S, C, D, R, P, I) |
|---|---|
| (2) Task BT | X2 (S, C, D, R, P, I) |
| ... | |
| (N) Task nT | Xn (S, C, D, R, P, I) |

Next, working in order in the list starting with the first task in the list, that is, with the task having the earliest start time, each task is "left shifted" as much as possible toward the start time boundary. That is, each task is unscheduled and rescheduled to occur at or as early as possible, but no earlier than the left or start time boundary or shortly thereafter, as desired, without violating any of the applicable constraints and requirements associated with the respective task. Thus each task is given a new start time, S, and, based on the data respecting the duration required for the particular task, the task is assigned a new completion time C. This creates a new listing, the "left shifted" task listing or schedule S5, represented in block 15, in which the tasks are maintained in the order set in the prior chronological listing.

This additional listing S5, which in itself is a schedule, is the schedule which is accepted by the program as the optimized schedule, and is represented as follows:

| (1) Task AU | Y1 (S, C, D, R, P, I) |
|---|---|
| (2) Task BU | Y2 (S, C, D, R, P, I) |
| ... | |
| (N) Task nU | Yn (S, C, D, R, P, I) |

Figure 3:
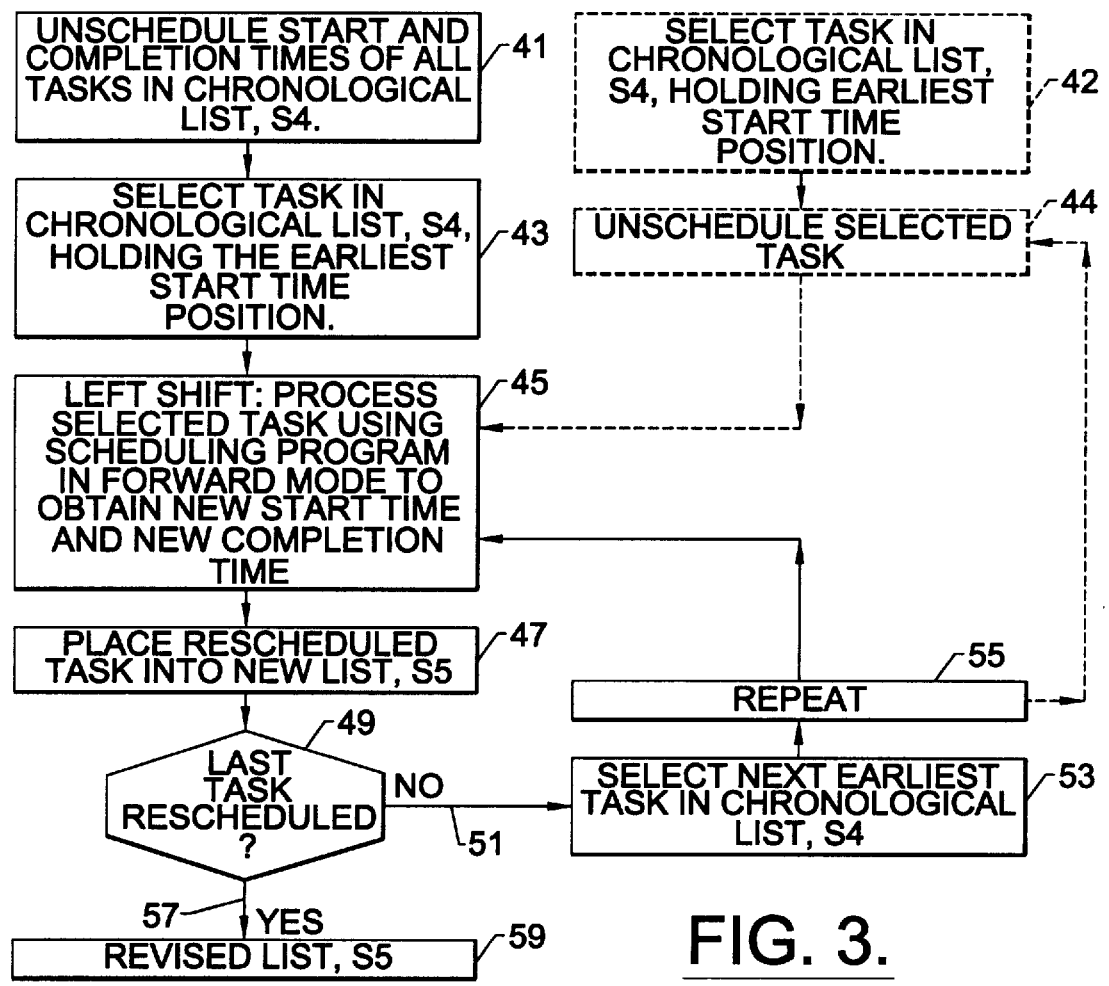
FIG. 3 is a flow chart of the left shift subroutine used in the method of FIG. 1.

As in the case of the right shifting, the left shifting of the tasks to the selected start time boundary may be accomplished in either of two subsidiary methods which are illustrated in FIG. 3, to which reference is made.

As illustrated by block 41 in FIG. 3 all tasks in chronological list S4 are unscheduled; a selection is made of the task in the earliest start time position in the chronological list as at block 43. As represented at block 45, the main scheduling program then processes that task and reschedules it to the earliest start time permissible consistent with any applicable resource constraints and, based on the duration of the task, assigns a new completion time also consistent with any applicable resource constraints; and places the task data in a memory location for another new list, as represented at block 47, in the first place location in the list.

Checking to determine whether the processed task was the final task requiring completion as at decision block 49, and receiving a negative as at block 51, the main scheduling program next selects the task from the list that had the next to the earliest start time, as represented at block 53 and repeats 55, returning to the forward mode shifting, as at block 45 to process the task and assign the next task the earliest permissible start time, again consistent with any resource constraints; and places the rescheduled left shift task in the next to the first position in the new list S5. This process repeats, task by task, consecutively filling the lower slots in the new list, until the decision at block 49 is affirmative, in which case an affirmative flag 57 pronounces the new revised list S5 complete as represented at block 59.

In the alternative procedure represented in part by the dash block outlines in FIG. 3, the task in the listing having the earliest start time position is selected as represented at block 42; and that selected task is unscheduled as represented at block 44; that task is then processed by the main program in the forward mode, as represented at block 45, to determine the earliest start time consistent with any resource restraints and a like completion time also consistent with those restraints. In so doing the main scheduling program references as needed the various times still assigned to the other tasks whose start and completion times have not been unscheduled, placing the task entry in the first position in a new list, as at block 59. As in the prior technique the program passes through the decisional block 49, the negative decision at 51 and the selection of the task in the listing having the next-to-first start time position, as represented at block 53 and repeats as at block 55, processing this next task as at block 45 to left shift the task to the then earliest permissible start time as close as permissible to and no later than the start time boundary Ss consistent with resource restraints, and assigns a completion time also consistent with resource constraints. This procedure continues until an affirmative decision occurs as at block 57, indicating that all of the tasks in the listing have been processed in the foregoing way and arrives at the revised listing S5 as at block 59.

Returning to FIG. 1, the new schedule S5 is the final step in the schedule optimization routine. The main schedule program then stores the schedule in memory, and overwrites or erases each of the original schedule and any intervening schedules as may have been produced and temporarily stored during the run of the scheduling program, which are not illustrated.

As additional steps to permit use of the schedule, the schedule is displayed on the computer's display device as represented at block 17, such as the associated computer monitor 8 and/or is printed out by the associated printer 10 represented in FIG. 4.

The optimizing program produces schedules of enhanced quality, that is, of lesser cycle time with at most a doubling of the execution time of the principal scheduling program. In one example, a schedule derived by the COMPASS scheduling program for performing a complex manufacturing project required 53 days for completion of the project. By subjecting that schedule to the additional algorithms presented in this specification, in just one run of the improved program, the schedule derived for the project required only 40 days for completion, a saving of 17 days time or 30%. Since the days saved represents considerable manufacturing overhead and money, the advantage and benefit of the improvement is apparent.

In general, applicant believes, that the modification should serve to improve all hueristic scheduling programs, moreso those scheduling programs that are regarded of poor quality and less so for those that are of higher quality. However, it is possible for a poor quality scheduling program to be modified to achieve the same quality as a higher quality program, but requires substantially less execution time to formulate the schedule.

Better quality schedules can often be produced by performing multiple repetitions of the basic right shift and left shift algorithm. Since this algorithm is designed to take an existing schedule, and by packing left and right, improve it, one is permitted to take the result of a first application of the algorithm as the input to a second application of the algorithm, and take the output of a second iteration and use it as the input to a third iteration, and so on. Generally, no further improvement is found after just two or three iterations of the described procedure.

The foregoing algorithm can be used to improve a selected time frame within a schedule by setting the left and right time boundaries accordingly. As example, if one has a schedule for four weeks worth of work, and desires to be able to accommodate some additional work in the second week without perturbing the schedule for the first, third, or fourth week, one can set the left boundary to be the start time of the second week and the right boundary to be the end time of the second week and apply the shift right/left operations. If the schedule has not been previously packed, it should reduce the cycle time for the work scheduled in the second week, leaving room in the schedule to accommodate a small amount of additional work, perhaps ten to twenty per cent more, depending upon the quality of the initial schedule. The algorithm thus is used to open up a "hole" at a designated point in an existing schedule.

The algorithm can be used to open up a "hole" at a designated point in an existing schedule by applying the algorithm first with the left boundary set at the beginning of the schedule and the right boundary set at the designated point. Then only the right shift phase of the algorithm is applied with the left boundary set at the designated point and the right boundary set at the end of the schedule. Instead of just shifting left and right within a given week, as in the preceding example, one might choose to shift right everything from Wednesday of the second week through the end of the third week, and then shift left everything from the beginning of the first week through Wednesday of the second week in order to open up as much capacity in the middle of the second week as is possible. This allows one to clear a space in the work calendar to be able to accommodate an anticipated rush order that will be ready for handling at that time.

The algorithm can be used to improve the cycle time for a subset of the tasks on a schedule by setting the left and right boundaries accordingly and then applying the shifting operations only to the selected activities. As example, if a given schedule includes the production of several aircraft all at the same time, which are in various stages of completion, one may desire to accelerate the completion of one aircraft, while leaving the others approximately as they are. To do so, one sets the left boundary to be the scheduled start time of the selected aircraft and set the right boundary to be the scheduled finish time of the selected aircraft and apply the described shift right/left operations to ONLY the steps of the selected aircraft, leaving the steps associated with the other aircraft unchanged, then the scheduling for the selected aircraft will be able to take advantage of any excess capacity within exactly that time frame. As another more interesting example, if given two aircraft being constructed according to a given schedule with interleaved operations, one may select the aircraft with the lower priority and shift its operations right, towards its completion time, and then select the high priority aircraft and shift its operations towards its start time. Then, in order to exploit any excess capacity that might remain, the full shift right/shift left procedure is performed only for tasks associated with the high priority aircraft. Again the results obtained depend largely upon the quality of the original schedule that is input to the algorithms. If one starts with a high quality schedule, the amount of movement obtained, that is, quality improvement, is small.

If the underlying scheduling program contains the ability to sort by additional or secondary keys, additional useful variations of the described algorithm are possible; and it is also useful if the scheduling program provides the ability, as an option, to schedule, unschedule and reschedule individual activities.

As example, if one computes the slack time for each activity in a given schedule, as hereafter described, and then sorts by two keys before the right pass, first, sorting by slack time from least to greatest, and then sorting by completion time from last to first, then if two tasks complete at the same time, the one with the least slack time will be shifted first. If one applies this additional sort key on both right and left passes, one obtains greater schedule improvement than when just sorting by completion and start times. The reason for this is that jobs with less slack time are more critical. By giving those jobs priority in the shifting process, they tend to shift into better locations on the schedule. Since they are the critical jobs they have more influence over the resulting cycle time.

The best way to determine the slack time associated with a task is to perform the schedule pack algorithm twice. The first time squeezes out the majority of the excess cycle time. Then during the second pack, if one carefully records how much a task moves during the left shift phase one obtains a very clear measure of slack time. Remember the task was shifted as far right as possible and then on the left pass, shifted as far left as possible. Anything that is truly critical will not move. Other tasks will move either a little or a lot.

Although the last described features are desirable for the underlying scheduling program, it is recognized that the foregoing options are not required for implementation of the basic algorithm.

Although the present application adopts the terminology of tasks and project, other terminology may be used without departing from the invention. As example others may refer to tasks as "activities" and to the project as the "task"; still others may refer to the tasks as "nodes" and to the project as a "principal node". Notwithstanding the choice of terminology employed, the steps in the described algorithm, by whatever name, remains as "sweet".

The underlying theory to the shifting procedure is recognized as being intuitive. In general, the first tasks placed on a schedule benefit from the flexibility in their choice of time and resources. Tasks placed on the schedule later in the scheduling process are left with only the times and resources that earlier activities did not use.

The sort procedures combined with the right and left phases, is believed to implicitly give higher priority to the right activities, while constructing the right shift and left shift schedules. When a schedule is built in the forward direction every task is scheduled to start and finish as early as possible. Because of that, critical activities in the left part of the schedule are crowded together with many other non-critical activities. But the right most activities on the schedule are found in that part of the schedule, because they follow critical activities in the left part of the schedule, and most are themselves critical.

In the right shift phase, these right-most critical activities are effectively given first priority in building the new right-shifted schedule. By similar analysis, the left-most activities in the right-shifted schedule are critical activities with little slack time and they are given first priority in the left shift phase. Between the two passes, the present algorithm gives first priority to the placement of critical activities at the right and then the left ends of the schedule, while allowing non-critical activities to shift freely in between. The foregoing also allows one to understand why using the additional sort key of slack time generally improves the performance of the algorithm.

The foregoing algorithms are seen to define a novel method for optimizing an existing computer assisted scheduling program. When permanently integrated within the source code of an existing computer assisted scheduling program a new and improved scheduling program is seen to result. The invention therefore may be seen also as a new scheduling program. The physical data defining that program may be carried upon a floppy disk or other computer peripheral memory device through which the method may be installed upon a programmable digital computer. In that sense the invention is also a program element. With the invention installed within a computer, either a general purpose computer in which the algorithms are installed from a program element, commonly referred to as software, or a special purpose computer dedicated to scheduling in which the algorithms are permanently installed within a read only memory, in that sense the invention is also a computer apparatus that performs the algorithm. All of the foregoing arrangements thus fall within the scope of my invention.

In the foregoing description, the word "time" was used to indicate either a starting point, such as start time, and/or an ending point in a schedule, such as completion time. On a calendar schedule that time would likely be expressed in terms of a calendar date and an hour or in terms of a number of twenty four hour periods following an arbitrary start date and hours, which renders the display of a schedule more easily understood by the operator. However, to minimize complication to this description, the convention used is to simply designate those dates and hours solely by the word "time".

The foregoing invention has been demonstrated as successful, having been embodied within a computer program and applied. An unpublished source code listing for that program, authored by the applicant, copyrighted by the McDonnell Douglas Corporation, written in the ADA language, accompanies this application in an Appendix hereto. That source code listing illustrates programming details of the described algorithm for implementation as an enhancement within the copyrighted COMPASS scheduling program. That source code listing is not available for publication or reproduction. While, it is appreciated that the foregoing description is sufficient in detail to enable one skilled in the art to make and use the invention, such unpublished source code listing may be inspected in the file of this application by those who wish to acquaint themselves with a specific example of a code listing that incorporates the described invention.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

APPENDIX
COPYRIGHT (UNPUBLISHED)- MCDONNELL DOUGLAS CORP.
Schedule Pack Source Program

```
PROCEDURE schedule_pack (Activitylist : IN OUT Activity_List.Typeactivitylist;
     Resourcelist : IN OUT Resource_List.Typeresourcelist;
     Conditionlist : IN OUT Condition_List.Typeconditionlist) is
minimum_start_time: time.typetime := time.positive_infinity;
maximum_finish_time: time.typetime := time.negative_infinity;
scheduling_window: interval.typeinterval;
forward_mode : mode.typemode := mode.strict_forward_mode;
backward_mode : mode.typemode := mode.strict_backward_mode;
workingactivitylist: activity_list.typeactivitylist;
workingresourcelist: resource_list.typeresourcelist;
workingconditionlist: condition_list.typeconditionlist;
localactivitylist: activity_list.typeactivitylist;
localresourcelist: resource_list.typeresourcelist;
localconditionlist: condition_list.typeconditionlist;
localactivity: activity.typeactivity;
localstart : time.typetime;
localfinish : time.typetime;
temp_activity_list: activity_list.typeactivitylist;
begin
workingactivitylist := activitylist;
workingresourcelist := resourcelist;
workingconditionlist := conditionlist;
localactivitylist := activitylist;
localresourcelist := resourcelist;
localconditionlist := conditionlist;
abstract_io.write_string(low_level_io.standard_output_file,"******************Optimizing Schedule*");
abstract_io.write_newline(low_level_io.standard_output_file);
minimum_start_time := interface.accept_time("Left Boundary for Packing Operation");
abstract_io.write_string(low_level_io.standard_output_file,"Scanning Schedule for Right
Boundary");
abstract_io.write_newline(low_level_io.standard_output_file);
--just a reminder that we need to change both sp and ccp to work on just selected
activities
Qualified_Name. Prefix (resource_name, Resource_Profile.Qualifiedname_Of
(Localresourceprofile) while not activity_list.nilp (localactivitylist) loop
localactivity := activity_list.first(localactivitylist);
     if activity.assigned_of(localactivity)then
        localfinish := activity.assigned_finish_of(localactivity);
     iflocalfinish>maximum_finish_time then
        maximum_finish_time := localfinish;
     end if;
     end if;
     localactivitylist := activity_list.rest(localactivitylist); end loop;
scheduling_window := interval.make(minimum_start_time,maximum_finish_time);
--first pack to the right, within the current bounds
--interface.display_message ("note", "sorting by status = completed");-- completed at the
bottom
Abstract_Io.Write_String (Low_Level_Io.Standard_Output_File,"sorting by status =
complete");
Abstract_Io.Write_Newline (Low_Level_Io.Standard_Output_File);
temp_activity_list := Sort_Commands.Sort_By_status
(workingActivityList,completed_id);
activity_list.shallow_collect(workingactivitylist);
workingactivitylist := temp_activity_list
--interface.display_message ("note", "sorting by precedence");
Abstract_Io.Write_String (Low_Level_Io.Standard_Output_File, "sorting by precedence");
Abstract_Io.Write_Newline (Low_Level_Io.Standard_Output_File);
temp_activity_list := Sort_Commands.Sort_By_Predecessors (workingActivityList);
activity_list.shallow_collect(workingactivitylist);
workingactivitylist := temp_activity_list;
--interface.display_message ("note", "sorting by assigned finish time");
Abstract_Io.Write_String (Low_Level_Io.Standard_Output_File, "sorting by assigned
finish time");
Abstract_Io.Write_Newline (Low_Level_Io.Standard_Output_File);
temp_activity_list:= Sort_Commands. Sort_By_Assigned_Finish_time
(workingActivityList);
activity_list.shallow_collect(workingactivitylist);
workingactivitylist := temp_activity_list;
--interface. display_message ("note", "sorting into reverse order");
Abstract_Io.Write_String (Low_Level_Io.Standard_Output_File, "sorting into reverse
order");
Abstract_Io.Write_Newline (Low_Level_Io.Standard_Output_File);
temp_activity_list := Sort_Commands.Reverse_order (workingActivityList);
activity_list.shallow_collect(workingactivitylist);
workingactivitylist := temp_activity_list;
--interface.display_message ("note", "sort for right pass complete");
```

APPENDIX
COPYRIGHT (UNPUBLISHED)- MCDONNELL DOUGLAS CORP.
Schedule Pack Source Program

```
Abstract_lo.Write_String (Low_Level_lo.Standard_Output_File, "sort for right pass
complete");
Abstract_lo.Write_Newline (Low_Level_lo.Standard_Output_File);
   localactivitylist := workingactivitylist;
Interface.Display_Activity_List(workingActivitylist);
abstract_io.write_string(low_level_io.standard_output_file, "packing right");
while not activity_list.nilp (localactivitylist) loop
   localactivity := activity_list.first(localactivitylist);
   if activity.assigned_of(localactivity) and then
(id. equal(activity.status_of(localactivity),completed_id) or
id.equal(activity.status_of(localactivity),inwork_id) or
id.equal(activity.status_of(localactivity),pending_id)) and then time.">"
(activity.assigned_finish_of(localactivity), minimum_start_time) then localstart :=
activity. assiqned_start_of (localactivity);
        --time.write_dshm
(low_level_io.standard_output_file,activity.assigned_start_of(localactivity));
        scheduling_primitives.Unschedule
(localactivity,workingactivitylist,workingresourcelist);
        scheduling_primitives.schedule
(localactivity,workingactivitylist,workingresourcelistsworkingconditionlist,
        scheduling_window, backward_mode);
if activity.assigned_of(localactivity) then
if time."=" (activity.assigned_start_of(localactivity), localstart ) then
abstract_io.write_string(low_level_io.standard_output_file,"=");
elsif time. ">" (activity.assigned_start_of(localactivity), localstart ) then
abstract_io.write_string(low_level_io.standard_output_file,">");
elsif time."<" (activity.assigned_start_of(localactivity), localstart ) then
abstract_io.write_string(low_level_io.standard_output_file,"<");
abstract_io.write_string(low_level_io.standard_output_file,"warning, failed to pack on
right pass");
Qualified_name.write(low_level_io.standard_output_fileXactivity.qualifiedname_of
(localactivity)); abstract_io.write_string(low_level_io.standard_output_file,"Old Time:");
time.write_dshm (low_level_io.standard_output_file,localstart);
abstract_io.write_string(low_level_io.standard_output_file,"New Time:");
time.write_dshm
(low_level_io.standard_output_file,activity.assigned_start_of(localactivity));
abstract_io.write_newline(low_level_io.standard_output_file);
end if;
else
     abstract_io.write_string(low_level_io.standard_output_file, "failed to reschedule on
     right pass");
     Qualified_name.write(low_level_io.standard_output_fileRactivity.qualifiedname_of
     (localactivity)), abstract_io.write_string(low_level_io.standard_output_file,"Old
     Time:"); time.write_dshm (low_level_io.standard_output_file, localstart);
     abstract_io. write_newline(low_level_io.standard_output_file);
     end if;
end if; localactivitylist := activity_list.rest(localactivitylist);
end loop;
-- then see which ones pack back to the left
--interface.display_message ("note", "sorting by status = completed");
Abstract_lo.Write_String (Low_Level_lo.Standard_Output_File, "sorting by status =
completed");
Abstract lo.Write Newline (Low_Level_lo.Standard_Output_File);
 temp_activity_list := Sort_Commands.Sort_By_status
(workingActivityList,completed_id);
 activity_list.shallow_collect(workingactivitylist);
 workingactivitylist := temp_activity_list;
--interface.display_message ("note", "sorting into reverse order");
Abstract_lo.Write_String (Low_Level_lo.Standard_Output_File, "sorting into reverse
order");
Abstract lo.Write Newline (Low_Level_lo.Standard_Output_File);
temp_activity_list:= Sort_Commands.Reverse_order (workingActivityList);
activity_list.shallow_collect(workingactivitylist);
workingactivitylist := temp_activity_list;
--interface.display_message ("note", "sorting by predecence");
Abstract_lo.Write_String (Low_Level_lo.Standard_Output_File, "sorting by predecence");
Abstract_lo.Write_Newline (Low_Level_lo.Standard_Output_File);
temp_activity_list := Sort_Commands.Sort_By_Predecessors (workingActivityList);
activity_list.shallow_collect(workingactivitylist);
workingactivitylist := temp_activity_list;
--interface.display_message ("note", "sorting by assigned start time");
Abstract_lo.Write_String (Low_Level_lo.Standard_Output_File, "sorting by assigned start
time");
Abstract_lo.Write_Newline (Low_Level_lo.Standard_Output_File);
temp_activity_list := Sort_Commands.Sort_By_Assigned_start_time
(workingActivityList);
```

APPENDIX
COPYRIGHT (UNPUBLISHED)- MCDONNELL DOUGLAS CORP.
Schedule Pack Source Program

```
activity_list.shallow_collect(workingactivitylist);
workinqactivitylist := temp_activity_list;
--interface.display_message ("note", "sort for left pass complete");
Abstract_lo.Write_String (Low_Level_lo.Standard_Output_File, "sort for left pass
complete");
Abstract_lo.Write_Newline (Low_Level_lo.Standard_Output_File);
localactivitylist := workingactivitylist;
Interface. Display_Activity_List(workingActivitylist);
abstract_io.write_string(low_level_io.standard_output_file, "packing left");
abstract_io.write_newline(low_level_io.standard_output_file);
while not activity_list.nilp (localactivitylist) loop
local activity: = activity_list.first (localactivity list);
if activity.assigned_of(localactivity) and then
(id.equal(activity.status_of(localactivity),completed_id) or
        id.equal(activity.status_of(localactivity),inwork_id) or
        id.equal(activity.status_of(localactivity),pending_id)) and then
    time.">" (activity.assigned_finish_of(localactivity), minimum_start_time) then
        localstart := activity.assigned_start_of(localactivity);
    --time.write_dshm
(low_level_io.standard_output_file,activity.assigned_start_of(localactivity));
scheduling_primitives.Unschedule (localactivity,workingactivitylist,workingresourcelist);
        scheduling_primitives.schedule
        (localactivity,workingactivitylist,workingresourcelistsworkingconditionlist,
        scheduling_window,forward_mode);
if activity.assigned_of(localactivity) then
    if time. "=" (activity.assigned_start_of(localactivity), localstart ) then
        abstract_io.write_string(low_level_io.standard_output_file,"=");
    elsif time."<" (activity.assigned_start_of(localactivity), localstart ) then
        abstract_io.write_string(low_level_io.standard_output_file,"<");
    elsif time.">" (activity.assigned_start_of(localactivity), localstart ) then
        abstract_io.write_string(low_level_io.standard_output_file,">");
        abstract_io.write_string(low_level_io.standard_output_file,"warning, failed
    to pack on left pass");
        Qualified_name.write(low_level_io.standard_output_file,activity.qualifiedname_of
    (localactivity));
        abstract_io.write string(low_level_io.standard_output_file,"Old Time:");
        time.write_dshm (low_level_io.standard_output_file,localstart);
        abstract_io.write_string(low_level_io.standard_output_file, "New Time:");
        time.write_dshm
        (low_level_io.standard_output_file,activity.assigned_start_of(localactivity));
        abstract_io.write_newline(low_level_io.standard_output_file);
    end if;
    else
        abstract_io.write_string(low_level_io.standard_output_file,"failed to
    reschedule on left pass");
        Qualified
    name.write(low_level_io.standard_output_file,activity.qualifiedname_of(localactivity));
        abstract_io.write_string(low_level_io.standard_output_file,"Old Time:");
        time.write_dshm (low_level_io.standard_output_file,localstart);
        abstract_io.write_newline(low_level_io.standard_output_file);
    end if;
end if;
localactivitylist := activity_list.rest(localactivitylist); end loop;
activitylist := workingactivitylist;
resourcelist := workingresourcelist;
conditionlist := workingconditionlist;
exception
    when Interface.Oops=> raise;
when others=>
    abstract_io.write_string(low_level_io.standard_output_file,"exception raised while
packing!");
    activity.write(low_level_io.standard_output_file, localactivity);
    abstract_io.write_newline_(low_level_io.standard_output_file);
    raise;
end schedule pack;
```

What is claimed is:

1. A computer assisted method of optimizing a preliminary schedule for performing a plurality of scheduled tasks that collectively complete a project, said preliminary schedule specifying no less than a start time, a completion time, identification, and resource requirements for each of the plurality of tasks in which any constraints associated with each resource are respected and the plurality of tasks complies with constraints on the order of performance of any one task relative to other tasks defined in the schedule, which includes the step of:

(a) inspecting completion times for said plurality of scheduled tasks in said preliminary schedule and determining latest completion time of any of said scheduled tasks;

(b) defining a completion time boundary, said boundary comprising a time equal to or later than said latest completion time;

(c) inspecting said start times for each of said plurality of scheduled tasks in said preliminary schedule and determining the earliest time of any of said plurality of scheduled tasks;

(d) defining a commencement time boundary, said boundary comprising a time at least equal to and no later than an earliest commencement time;

(e) sorting said plurality of scheduled tasks in said preliminary schedule into chronological order by completion times to derive a temporary chronological listing comprising the completion times for each task;

(f) following said sorting and commencing with one of said tasks in said temporary chronological listing having said latest completion time and continuing with the remaining ones of said tasks in reverse chronological order by completion time (f1) rescheduling each task in said temporary chronological listing to a new completion time that is as close to said completion time boundary as is permissible without violation of any constraint associated with such task and, based on the duration of respective tasks, to a new start time, said rescheduling being without violation of any constraint associated with such task, whereby each task is assigned a new completion and start time to create a first revised temporary listing of tasks arranged in the order found in said derived temporary listing; and, (g) sorting said plurality of tasks in said first revised temporary listing into chronological order by commencement times to derive a second temporary chronological listing comprising the start times for each task;

(h) commencing with one of said tasks in said second temporary chronological listing having the earliest start time and continuing with the remaining ones of said tasks in ascending chronological order by start time, (h1) rescheduling each task in said second temporary chronological listing to a new start time that is as close to said commencement time boundary as is permissible without violation of any constraint associated with such task and, based on the duration of said respective tasks to a new completion time, said rescheduling being without violation of any constraint associated with such task, whereby each task is again assigned a new start time and completion time to create a third listing of tasks arranged in the same order found in said second temporary chronological listing, said third listing of tasks comprising an optimized schedule.

2. The method as defined in claim 1, wherein the step (f1) of rescheduling includes the step of:

(f1)(a) unscheduling all tasks in said temporary chronological listing by removing the associated start and completion times thereof prior to assigning a completion time for any of said tasks.

3. The method as defined in claim 1, wherein the step (f1) of rescheduling includes the steps of:

(f1) (a) removing the associated start time of the task having the latest completion time;

(f1) (b) rescheduling said respective tasks to a new completion time that is as close in time period to said completion time boundary as is permissible without violating any constraint associated with said tasks; and, (f1) (c) based on the respective duration of said respective tasks, assigning a new start time for said respective tasks without violating any constraint associated with said tasks; and (f1) (d) repeating steps (f1) (a) through (f1) (c) in reverse chronological order by completion time for each of said tasks.

4. The method of claim 1, further including the computer assisted method of generating said schedule for optimizing which comprises the steps of:

(1) listing no less than the identification of and the duration time anticipated for completion of each of said plurality of tasks necessary to complete said project and, with respect to each of said tasks, any constraints associated therewith, including, for each respective task, the identification of any other task that requires completion prior to commencement of the respective task and any resources required by said respective task; and (2) formulating a preliminary schedule for performance of said plurality of tasks, in which each of said tasks is completed without violation of a respective associated constraint, said preliminary schedule, including, for each of said tasks, at least a start time and a completion time.

5. The method as defined in claim 1, further comprising the steps of accepting the optimized schedule derived from steps (a) through (h) and repeating thereon steps (a) through (h) to derive a further optimized schedule.

6. The method as defined in claims 1, 2, 3, 4 or 5, further comprising the step of displaying said optimized schedule.

7. A programming element for an electronic digital computer comprising a programming medium and program data means resident on said medium for actuating a computer to execute a method as set forth in claims 1 or 4.

8. A computer assisted method of generating a schedule for performing a plurality of scheduled tasks that collectively complete a project, said method being carried out with the aid of a programmed computer, said method comprising the steps of:

(1) listing no less than the identification of and the duration time anticipated for completion of each of a plurality of tasks necessary to complete said project and, with respect to each of said tasks, any constraints associated therewith, including, for each respective task, the identification of any other task that requires completion prior to commencement of the respective task and any resources required by said respective task; and (2) formulating a preliminary schedule for performance of said plurality of tasks, in which each of said tasks is completed without violation of a respective associated constraint, said preliminary schedule, including, for each of said tasks, at least a start time and a completion time;

(a) inspecting each of said completion times for said plurality of scheduled tasks in said preliminary schedule and determining the latest completion time of any of said tasks scheduled therein;

(b) defining a completion time boundary, said boundary comprising a time equal to or later than said latest completion time;

(c) inspecting each of said start times for each of said plurality of scheduled tasks in said preliminary schedule and determining the earliest start time of any of said plurality of scheduled tasks therein;

(d) defining a commencement time boundary having an earliest commencement time, said boundary comprising a time at least equal to and no later than said earliest commencement time;

(e) sorting said plurality of scheduled tasks in said preliminary schedule into chronological order of the respective completion times of each of said tasks to derive a temporary listing of completion times for each task in descending chronological order, wherein the first task initially scheduled for completion in said plurality of scheduled tasks appears first in said listing and the last task initially scheduled for completion in said plurality of scheduled tasks appears last in said listing;

(f) commencing with said last task in said temporary listing and continuing through said temporary listing in reverse chronological order of completion times, (f)(1) unscheduling the respective preliminarily scheduled tasks by removing the associated start and completion times; and (f)(2) rescheduling the respective tasks to a new completion time that is as close in time period to said completion time boundary as is permissible without violating any constraint associated with said tasks; and, (f)(3) based on the respective duration of said respective tasks, assigning a new start time for said respective tasks, to define a second temporary listing in which said tasks are ordered in the same order as in said first named temporary listing;

(g) sorting said plurality of tasks in said second temporary listing into chronological order of the respective start times of each of said tasks to derive a further temporary listing of start times for each task in descending chronological order of start times, wherein the first task initially scheduled for commencement in said plurality of tasks in said second temporary listing appears first in said further temporary listing and the last task initially scheduled for commencement in said plurality of tasks in a right shift task temporary listing appears last in said further temporary listing;

(h) commencing with the first task in said further temporary listing and continuing through said further temporary listing in chronological order of commencement times, (h1) unscheduling the respective scheduled task and, (h2) rescheduling the respective tasks to a new commencement time that is as close in time to a left boundary as is permissible without violating any constraint associated with such respective task; and (h3) based on the respective duration of said respective task, assigning a new completion time for said respective tasks, to define an optimized schedule of tasks for completion of a given task.

9. The method as defined in claim 8, further comprising the step of displaying said optimized schedule.

10. A programming element for an electronic digital computer comprising a programming medium and program data means resident on said medium for actuating a computer to execute a method as set forth in claim 8.

11. A computer assisted method of generating a schedule for performing a plurality of scheduled tasks that collectively complete a project, said method being carried out with the aid of a programmed computer, said method comprising the steps of:

(1) listing no less than the identification of and the duration time anticipated for completion of each of a plurality of tasks necessary to complete said project and, with respect to each of said tasks, any constraints associated therewith, including, for each respective task, the identification of any other task that requires completion prior to commencement of the respective task and any resources required by said respective task; and (2) formulating a preliminary schedule for performance of said plurality of tasks, in which each of said tasks is completed without violation of a respective associated constraint, said preliminary schedule, including, for each of said tasks, at least a start time and a completion time;

(a) inspecting said completion times for said plurality of scheduled tasks in said preliminary schedule and determining the latest completion time of any of said scheduled tasks;

(b) defining a completion time boundary, said boundary comprising a time equal to or later than said latest completion time;

(c) inspecting said start times for each of said plurality of scheduled tasks in said preliminary schedule and determining the earliest time of any of said plurality of scheduled tasks;

(d) defining a commencement time boundary, said boundary comprising a time at least equal to and no later than said earliest commencement time;

(e) sorting said plurality of scheduled tasks in said preliminary schedule into chronological order by completion times to derive a first temporary chronological listing comprising the completion times for each task;

(f) following said sorting and commencing with one of said tasks in said temporary chronological listing having said latest completion time and continuing with the remaining ones of said tasks in reverse chronological order by completion time (f1) rescheduling each task in said temporary chronological listing to a new completion time that is as close to said completion boundary time as is permissible without violation of any constraint associated with such task and, based on the duration of said respective tasks, to a new start time, said rescheduling being without violation of any constraint associated with said tasks, whereby each task is assigned a new completion and start time to create a first revised temporary listing of tasks arranged in the order found in said first derived temporary listing; and, (g) sorting said plurality of tasks in said first revised temporary listing into chronological order by commencement times to derive a second temporary chronological listing comprising the start times for each task;

(h) commencing with one of said tasks in said second temporary chronological listing having the earliest start time and continuing with the remaining ones of said tasks in ascending chronological order by start time, (h1) rescheduling each task in said second temporary chronological listing to a new start time that is as close to said commencement boundary time as is permissible without violation of any constraint associated with said tasks and, based on the duration of said respective tasks, to a new completion time, said rescheduling being without violation of any constraint associated with said tasks, whereby each task is again assigned a new start time and completion time to create a third listing of tasks arranged in the same order found in said second temporary chronological listing, said third listing of tasks comprising an optimized schedule.

12. A computer assisted method of optimizing a preliminary schedule for performing a plurality of scheduled tasks that collectively complete a project, said preliminary schedule specifying a start time and a completion time that define a respective duration, said preliminary schedule respecting any constraints associated with each task including constraints on the order of performance of any one task relative to other tasks, the method including the steps of:

defining a completion time boundary no earlier than the latest completion time of any of said scheduled tasks;

defining a commencement time boundary no earlier than the earliest start time of any of said plurality of scheduled tasks;

rescheduling each task such that the completion time for each task is rescheduled to a first new completion time that is as close to said completion time boundary as is permissible without violation of any constraint associated with such task, wherein said rescheduling step further alters the start time for each task based on the duration of each respective task to define a first new start time such that each task is assigned a first new completion time and a first new start time as a result of said rescheduling step to thereby create a revised temporary listing of tasks;

further rescheduling each task such that the first new start time for each task is rescheduled to a second new start time that is as close to said commencement time boundary as is permissible without violation of any constraint associated with such task, wherein said rescheduling step further alters the first new completion time for each task based on the duration of each respective task to define a second new completion time such that each task is assigned a second new completion time and a second new start time as a result of said further rescheduling step to thereby create a listing of tasks comprising an optimized schedule.

13. The method as defined in claim 12 further comprising the step of unscheduling all tasks in said preliminary schedule by removing the associated start time and completion time for each task prior to the initial step of rescheduling each task.

14. The method as defined in claim 13, wherein said initial step of rescheduling each task includes the steps of:

removing the associated start time of each task;

rescheduling the completion time for each tasks to a first new completion time that is as close in time period to said completion time boundary as is permissible without violating any constraint associated with said tasks; and rescheduling the start time associated with each task based on the duration of each task to a first new start time without violating any constraint associated with said task.

* * * * *